Dec. 2, 1941.  L. GREER  2,264,838
DYNAMOELECTRIC MACHINE
Filed July 23, 1940
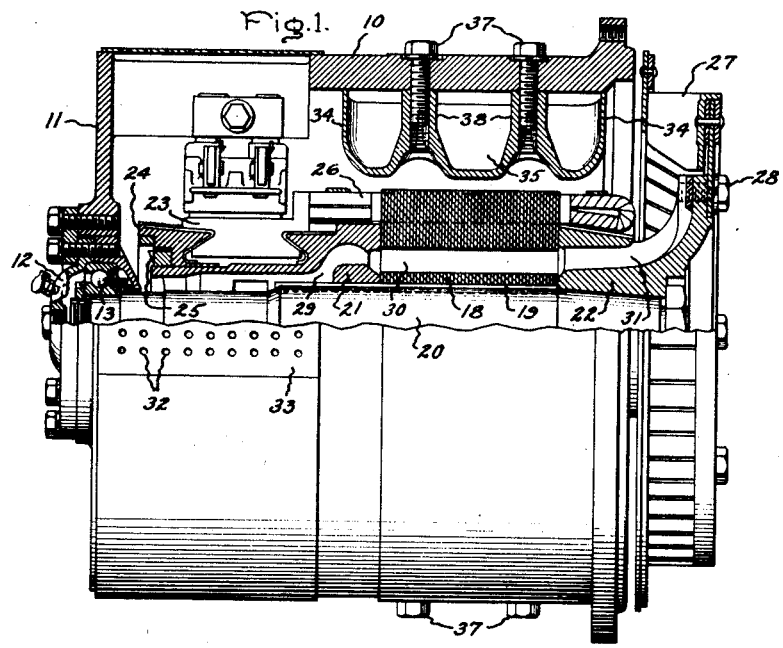
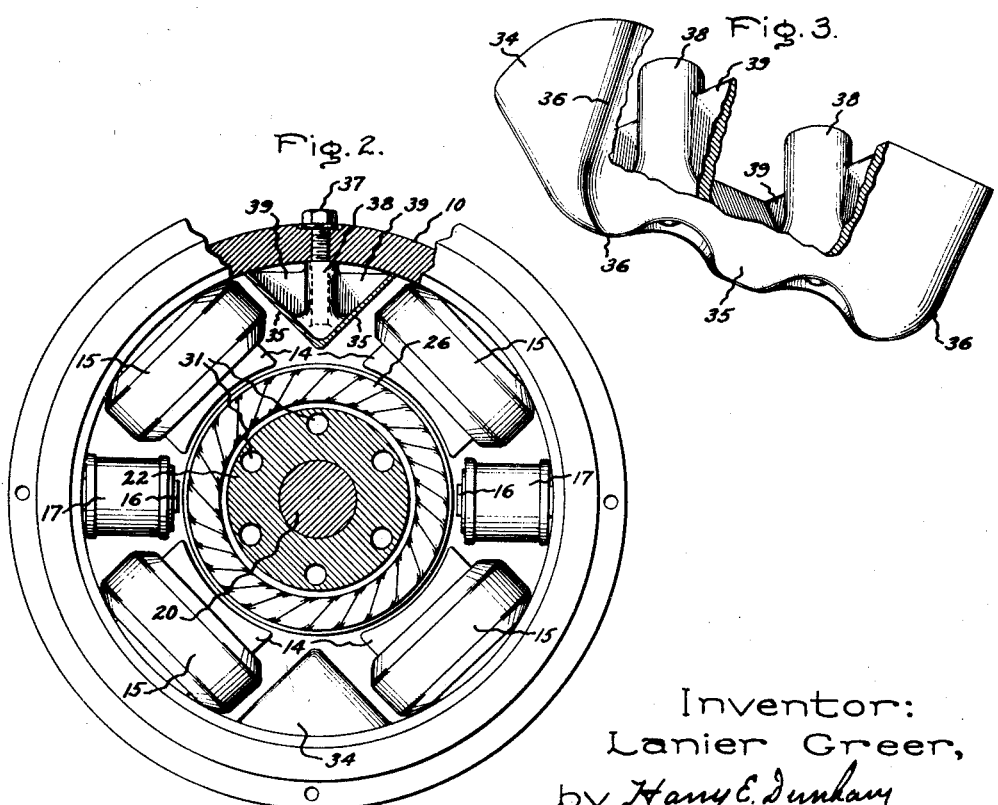
Inventor:
Lanier Greer,
by Harry E. Dunham
His Attorney.

Patented Dec. 2, 1941

2,264,838

UNITED STATES PATENT OFFICE 2,264,838

DYNAMOELECTRIC MACHINE

Lanier Greer, Erie, Pa., assignor to General Electric Company, a corporation of New York Application July 23, 1940, Serial No. 346,915

6 Claims. (Cl. 171—252)

My invention relates to improvements in dynamo-electric machines.

An object of my invention is to provide an improved and simplified ventilating system for dynamo-electric machines.

Another object of my invention is to provide an improved air baffle for use in the ventilating system of a dynamo-electric machine.

Further objects and advantages of my invention will become apparent and my invention will be better understood from the following description referring to the accompanying drawing, and the features of novelty which characterize my invention will be pointed out with particularity in the claims annexed to and forming part of this specification.

Referring to the drawing, I have shown in Fig. 1 a side elevational view, partly in section, of a dynamo-electric machine provided with my improved ventilating system; Fig. 2 is an end elevational view of the machine shown in Fig. 1, partly broken away to illustrate the relative arrangement of my improved air baffle and the stationary and rotatable parts of the machine; and Fig. 3 is a perspective view, partly broken away, of my improved air baffle.

In the drawing I have shown a dynamo-electric machine provided with a stationary member having a magnet frame 10 and an end shield 11 to which is secured a bearing housing 12 having a bearing 13. The stationary member is provided with an excitation system having a plurality of main exciting pole pieces 14 which are excited by main field exciting windings 15 and commutating pole pieces 16 excited by commutating field exciting windings 17. In a four-pole machine such as is illustrated in the drawing, it is not necessary to provide four commutating pole pieces, and, therefore, only two commutating pole pieces 16 are mounted diametrically opposite each other between pairs of main pole pieces 14.

The rotatable member of the dynamo-electric machine includes an armature core 18 of laminated magnetic material which is secured by a key 19 against relative rotatable movement upon a shaft 20 supported at one end by the bearing 13. The laminated core 18 is secured against axial movement upon the shaft 20 by an armature head 21 at the commutator end thereof and by another armature head 22 at the other end thereof. A commutator 23 is mounted upon the armature head 21 and secured thereto by a clamping ring 24 and a commutator nut 25. The armature also is provided with a winding 26 arranged within winding slots in the core 18 and connected to the commutator 23. In order to provide for cooling the rotatable member of the machine, a centrifugal fan 27 is secured by bolts 28 upon the armature head 22 at the end of the armature opposite the commutator. The armature head 21 adjacent the commutator 23 is formed with a plurality of axially extending openings 29 which communicate with corresponding axial passages 30 formed in the laminated core 18 and axial passages 31 formed in the armature head 22. These axial passages all extend to the inner base of the fan 27, so that air may be drawn into the machine through openings 32 formed in a perforated cover 33 arranged over the commutator end of the machine and through the axial passages so as to cool the rotatable member of the machine. The blades of the fan 27 also are arranged to draw air through the machine between the various pole pieces and through the air gap between the pole pieces and the armature.

In order to increase the efficiency of the cooling system of this machine, an air baffle is arranged in the interpolar space between adjacent main pole pieces 14 in which no commutating pole piece 16 or other machine part is located. This air baffle is formed with smooth surfaces in order to reduce air friction and is provided with end section surfaces 34 and side section surfaces 35 which taper from the outer edges thereof to an apex adjacent the inner edge thereof providing a wedge-shaped baffle conforming generally to the sides of the pole pieces 14 as shown in Figs. 2 and 3. The air resistance is further reduced by providing curved joining surfaces 36 where adjacent main baffle surfaces change direction. Each baffle is secured to the magnet frame 10 by bolts 37 which extend through the frame and threadedly engage openings in bosses 38 formed in the baffles between reinforcing webs 39 which join the bosses to the sides of the baffle. This baffle is so constructed as to fill substantially all of the space between the main pole pieces so as to direct the cooling medium into contact with the outer heat transfer surfaces of the main field exciting windings 15 and the outer heat transfer surfaces of the armature winding and core. In this manner, the velocity of the cooling air is increased and its cooling effect is correspondingly increased, while the volume of flow of cooling air through the machine is decreased, thereby decreasing the noise of the machine. In this manner the improved cooling system and baffle construction not only increase the efficiency of the cooling medium for a given flow of cooling medium through the machine, but also reduce the noise of the machine by reducing the volume of air which flows through the machine.

While I have illustrated and described a particular embodiment of my invention, modifications thereof will occur to those skilled in the art. I desire it to be understood, therefore, that my invention is not to be limited to the particular arrangement disclosed, and I intended in the appended claims to cover all modifications which do not depart from the spirit and scope of my invention.

What I claim as new and desire to secure by Letters Patent of the United States is:

1. A dynamo-electric machine having a rotatable member and a stationary member provided with pole pieces, field exciting windings on said pole pieces, means for forcing the flow of cooling medium through said machine, means including a wedge-shaped baffle having main end and side sections provided with smooth curved interconnecting surfaces for deflecting the cooling medium over said rotatable member and said field exciting windings and substantially filling the space within the machine in which no machine part is located to provide a higher velocity of the cooling medium in contact with the heat transfer surfaces of the machine and for reducing the volume of cooling medium flow through the machine thereby decreasing the noise thereof, and means including bosses formed in said baffle for securing said baffle to said stationary member.

2. A dynamo-electric machine having a rotatable member and a stationary member provided with pole pieces, field exciting windings on said pole pieces, means for forcing the flow of cooling medium through said machine, means including an air baffle constructed to deflect the cooling medium over said rotatable member and said field exciting windings for providing a higher velocity of the cooling medium in contact with the heat transfer surfaces of the machine thereby increasing the cooling effect for a given flow thereof, said baffle having main end and side sections provided with smooth interconnecting surfaces and said side sections being arranged to provide a substantially wedge-shaped baffle, and means including bosses formed in said baffle for securing said baffle to said stationary member.

3. A dynamo-electric machine having a rotatable member and a stationary member provided with pole pieces, field exciting windings on said pole pieces, means for forcing the flow of cooling medium through said machine, means including a wedge-shaped air baffle constructed and arranged substantially to fill the space between adjacent pole pieces and to deflect the cooling medium from between said pole pieces into contact with said rotatable member and said field exciting windings to provide a higher velocity of the cooling medium in contact with the heat transfer surfaces of the machine thereby increasing the cooling effect for a given volume of cooling medium, said baffle having main end and side surface sections interconnected by curved joining surfaces, and means including bosses formed in said baffle for securing said baffle to said stationary member.

4. An air baffle for a dynamo-electric machine having main end and side surface sections constructed for deflecting air from space between pole pieces of the machine to flow over heat transfer surfaces of the machine and constructed with curved joining surfaces where adjacent of said main baffle surfaces extend in different directions, said side surface sections being arranged to provide a substantially wedge-shaped baffle, and means including bosses formed in said baffle for securing said baffle to a supporting member.

5. A wedge-shaped air baffle for a dynamo-electric machine having main end and side surface sections provided with smooth surfaces for deflecting air to flow over heat transfer surfaces of the machine parts from space within the machine in which no machine part is located, sections having curved surfaces joining adjacent main surfaces which extend in different directions, and bosses formed in said baffle for securing said baffle to a supporting member.

6. An air baffle for a dynamo-electric machine having main end and side surface sections provided with smooth surfaces for deflecting air over heat transfer surfaces of machine parts from space within the machine in which no machine part is located, said side sections being arranged to provide a substantially wedge-shaped baffle, sections having curved surfaces joining adjacent main surfaces which extend in different directions, and bosses formed in said baffle with webs extending between said bosses and the sides of said baffle for securing said baffle to a supporting member.

LANIER GREER.